3,223,513
PESTICIDAL RESIN AND METHOD OF
PREPARING SAME
Robert J. Geary, Vero Beach, Fla., assignor to Plant Products Corporation, Blue Point, N.Y., a corporation of New York
No Drawing. Filed Oct. 14, 1959, Ser. No. 846,238
10 Claims. (Cl. 71—2.3)

This invention relates to new biologically active compositions, and in particular, to pesticidal compositions which are not only outstandingly safe to use but, in addition, exhibit a continuous and sustained action over a much longer period of time than heretofore obtainable with similar agents under the same conditions of use.

It is, of course, well recognized that among the various compounds and compositions which are employed as insecticides, herbicides, fungicides, nematocides, and bactericides, a great number, if not the preponderance thereof, are substances poisonous to other forms of life than the specifically intended application. Aside from danger to the user, that is, man, other mammals, birds, fishes, and desirable plant life may be subjected or exposed to undesirable or even lethal concentrations of the aformentioned types of agents, and thereby be severely injured, permanently damaged or totally destroyed. In the insecticide field such highly toxic substances as the organic phosphates, the carbamates, and the chlorinated hydrocarbons are used in tremendous quantities not only on an industrial or professional scale but also by literally millions of "Do It Yourself" amateurs in the home garden and the like, and in both of these categories there is the constant danger of toxic reactions in all forms of life other than the particular form it is desired to control or destroy. In addition to the dangers inherent in the handling of these economic poisons, there is also a considerable hazard due to the lingering action of the pesticides.

It is, therefore, an object of this invention to provide biologically active compositions which are outstandingly safe to handle.

It is another object of this invention to provide methods for the preparation of biologically active compositions which are outstandingly safe to handle.

It is still another object of this invention to provide biologically active compositions which give a sustained activity over an extended and/or predetermined period of time, and methods for the preparation thereof.

It is a still further object of this invention to provide biologically active compositions which give a sustained and controlled release of active principle sufficient to neutralize or destroy the selected pest, without detrimentally affecting other forms of life.

It is still another object of this invention to provide processes for the preparation of biologically active compositions which are characterized by a sustained and controlled release of active principle in an amount sufficient to render innocuous and/or destroy the selected pest without affecting, in any deleterious manner, other forms of life.

It is still another object of this invention to provide methods for controlling and/or destroying selected pests.

Another object of this invention is to provide processes whereby selected pests in a given environment may be controlled and/or destroyed, and particularly to provide processes whereby such control and/or destruction may be effected without danger or harm to other forms of life.

Other objects and advantages will appear hereinafter as the description proceeds.

The ends and objects to which the present invention is directed, are attained by combining the biologically active material with an amido-aldehyde type resin, whereby the active principle is rendered partially deactivated.

It is well known that many biologically active reagents, both organic and inorganic, may and can be employed as impregnants for various inert carrier substances. Among such inert materials, mention may be made of clays, peat, expanded or exfoliated mica, expanded or exfoliated perlite, and the like as exemplifying the inorganic carriers, and tobacco stems, ground corn cobs, coconut shells, walnut shells, redwood bark, and the like, as exemplifying the organic carriers. Insecticides, herbicides, fungicides, nematocides, and other pesticidal and pest inhibiting agents are commonly used with the above mentioned carriers, but it will be at once evident that, in general, the function of the carrier is to facilitate application of the agent and it does not affect the toxicity or safety factor. It is obvious that, in most instances, the concentration of the active ingredient, in order to achieve the desired ends, need not be very great, and therefore, in order to obtain effective dispersal and distribution thereof, use in a diluted form is called for. It is equally true that when employed in such diluted forms, the biologically active compounds are safer to handle than in the more concentrated forms, but as pointed out above, the basic toxicity factor of the active ingredient is not changed. In my copending application Serial No. 846,237 field on even date herewith, now U.S. Patent No. 3,074,845, such combinations of carrier, pesticide and resin are claimed.

I have discovered that by the technique of combining the biological material with the amido-aldehyde resin in the manner to be described, there is obtained a combination of active principle and resin, in addition to any other additives which has unique properties of safety and concomitant therewith outstanding characteristics for pesticidal control and/or destruction.

The amido-aldehyde resins herein contemplated include the following combinations:
Urea-formaldehyde
Melamine-formaldehyde
Guanidine-formaldehyde
Dicyandiamide-formaldehyde
Biuret-formaldehyde
Cyanamide-formaldehyde
Dicyandiamidine-formaldehyde
Thiourea-formaldehyde
Urea-thiourea-formaldehyde
Urea-melamine-formaldehyde In addition to the amides exemplified above other substituted forms thereof may be used, as, for example, Alkyl ureas, e.g., methyl urea, ethyl urea, etc.
Aryl ureas, e.g., phenyl urea, unsym. diphenyl urea, etc.
Alkyl aryl ureas, e.g., unsym. methyl phenyl urea, etc.
Alkyl thioureas
Aryl thioureas
Alkyl aryl thioureas
Alkyl and aryl guanidines, e.g., diphenyl guanidine
Alkyl melamines, e.g., 2,4,6-triethyltriamino-1,3,5-triazine
Aryl melamines, e.g., 2,4,6-triphenyltriamino-1,3,5-triazine It is, of course, understood that mixtures of the aforementioned amino compounds may be used to obtain resins of varying physical and chemical characteristics.

In addition to formaldehyde as the source of the aldehyde moiety, other aldehydes may be used in admixture therewith or in lieu thereof. Such aldehydes include:
Paraformaldehyde
Acetaldehyde
Hexamethylenetetramine
Butyraldehyde
Crotonaldehyde
Benzaldehyde
Furfural, and the like.

Various modifying agents well known in the resin art may be admixed or reacted with any of the above described condensation products. As modifying agents, there may be employed monohydric alcohols, e.g., ethyl, propyl, isopropyl, butyl, amyl, nonyl, decyl, tridecyl alcohol, etc., polyhydric alcohols, e.g., ethylene glycil, diethylene glycol, glycerine, 1,4-butanediol, pentaerythritol, etc., amides, e.g., formamide, acetamide, stearamide, benzamide, toluene sulphonamides, etc., amines, such as ethylene diamine, aniline, phenylene diamines, natural gums and resins such as shellac, rosin, rosin esters and other rosin derivatives, gelatin, alginates, cellulose ethers and esters, dyes, fillers, pigments, plasticizers, and the like. There may also be added or interacted fatty acids and oils such as oleic, linoleic, etc., as well as other acids of the aliphatic and aromatic series as for example: succinic acid, malonic acid, suberic acid, sebacic acid, adipic acid, phthalic acid, terephthalic acid, phenols, naphthols, and the like.

I have discovered that by combining the biologically active material with the resin-forming constituents there is obtained an occlusion or fusion of the active principle with the resin to form a "clathrate" compound. This combination is essentially, in its physical form, sieve-like or spongelike in structure, with the molecules of the active biological fitted into the inter-spaces of the polymer. By virtue of the strong physico-chemical forces between the resin and the biological compound, it is possible to employ as the biological substance highly volatile compounds and even gases, and in the occluded combination, very favorable properties are forthcoming in the control of pests of man and animals. Thus the biological can be displaced from the polymer and thereby made available as an active biological principle by the proper addition or treatment of other compounds, preferably in the liquid or gaseous stage. By the employing of such combinations of active principle and resin as herein taught in an environment where there is present a substance to displace the biological, the latter becomes immediately available in active form. This is to be contrasted with a resin-coated active principle which requires a break-down or degradation of the resin before the active biological becomes available.

The invention as herein described is applicable to any biologically active material or composition and, in particular, to insecticides, fungicides, herbicides, nematocides, bactericides and other biocides, plant growth regulators and the like, which are utilized in an environment which will promote the activation thereof as above described. Among the biologicals which are contemplated, mention may illustratively be made of the following:

DDT
Chlordane
Dieldrin
TDE (dichlorodiphenyl dichloroethane)
Methoxychlor
Heptachlor
Gamma benzene hexachloride
Isolan (1-isopropyl-3-m-ethyl pyrazolyl-5-dimethyl carbamate)
3-methyl-pyrazolyl dimethylcarbamate
Aldrin (1,2,3,4,10,10-hexachloro-1,4,4*a*,5,8,8*a*-hexahydro-1,4-endo-exo-5,8-dimethanonaphthalene)
Endrin (1,2,3,4,10,10-hexachloro-6,7-epoxy-1,4,4*a*,5,6,7,8,8*a*-octahydro-1,4-endo-endo-5,8-dimethanonaphthalene)
Isodrin (1,2,3,4,10,10-hexachloro-1,4,4*a*,5,8,8*a*-hexahydro-1,4-endo-endo-5,8-dimethanonaphthalene)
Maneb (manganese ethylene bisdithiocarbamate)
Zineb (zinc analog of Maneb)
Naban (disodium analog of Maneb)
Ferbam (ferric dimethyl dithiocarbamate)
Ziran (zinc analog of Ferbam)
Captan (N-trichloromethylmercapto-4-cyohexane-1,2-dicarboximide)

Karathane 2,4-dinitro-6-capryl phenol crotonate)
Aramite (butyl phenoxyisopropyl chloroethyl sulfite)
Ovotran (p-chlorophenyl-p-chlorobenzenesulphonate)
Sulphenone (p-chlorophenyl sulphone)dichlorophenyl benzenesulphonate)
Parathion
Dimethyl parathion
Demeton O,O-diethyl-O-2-ethylmercaptoethyl thiophosphate)
Octamethyl pyrophosphoramide
O,O-diethyl bis(dimethylamide) pyrophosphate, sym., and unsym.
Diethoxythiophosphoryl tetramethyl-diamido phosphate
Decamethylpentamidotriphosphate
α-diethoxyphosphinodithioacetylurea
α-dimethoxyphosphinodithioacetylurea
Diethoxyphosphinodithioacetamide
Dimethoxyphosphinodithioacetamide
Bis(dimethylamido) phosphoryl fluoride
Bis(dimethylamido) phosphoryl azide
2-chlorovinyl diethyl phosphate
Sodium selenate
Potassium selenate
Sodium fluoroacetate
2,4–D
2,4,5–T
Chloro IPC
Phenyl mercuric acetate
Nemagon (Shell)
Cadmium chloride
Diuron (Du Pont)
Monuron (Du Pont)
Seminzin (Geigy)
Delapon (Dow)
EPTam (Stauffer), and the like
Aminotriazole
Thimet
Dowco 109 and its oxygen analog
Various biologically active inorganic salts of metals such as copper, silver, chromium, mercury, etc.

The amounts of biological and resin may be varied considerably depending upon the particular agents employed. Thus, with the highly toxic biologically active materials more resin is preferred. In general, it will be found that for the preponderance of biologicals, there may be used for each part thereof, from about 0.2 to 50 parts of resin and the preferred range is from about 1 to 20 parts of resin per part of biological.

The following examples will serve to illustrate the present invention without being deemed limitative thereof. Unless otherwise indicated, parts and proportions referred to herein are by weight.

*Example 1*

10 parts Dowco 109 is mixed together with 7.2 parts of 40% aqueous formaldehyde and 4 parts urea and 0.1 part of 85% phosphoric acid. The polymerized mass is then finely ground in a mill and is found to be admirably suited for use in the rumen of cattle for parasitic control and for destruction.

*Example 2*

A mixture of 3 parts Dipterex (O,O-dimethyl 1-hydroxy-2-trichloromethyl phosphonate), 10 parts 37% aqueous formaldehyde and 5 parts urea is prepared and 0.1 part 85% phosphoric acid is then added to effect polymerization. A hard, glass-like product results which is water-insoluble but is nevertheless outstandingly effective as a pesticide.

*Example 3*

The product of Example 2 is ground to a fine powder and added to a sugar solution. House flies feeding on this sugar solution are killed instantly.

Example 4

The following composition is prepared and polymerized

| | Parts |
|---|---|
| Aqueous formaldehyde, 37% | 10 |
| Urea | 15 |
| Bayer L 13/59 | 15 |
| phosphoric acid, 85% | 0.3 |

The polymerized product is finely ground, divided into 2 aliquot portions and molded into 2 capsules.

Example 5

The two capsules of Example 4 were given orally to a Jersey calf, 3 months old, weighing 120 pounds. The lethal dose of the Bayer parasiticide (O,O-dimethyl-1-hydroxy-2-trichloromethyl phosphonate) was previously determined to be 50 mg./kilogram. The calculated dose of the 2 capsules is found to be 140 mg./kilogram, yet the calf showed almost complete absence of poisoning or toxicity. Some slight increase in defecation was observed. Samples of blood were taken hourly for the first 5 hours to ascertain choline esterase readings. Within the first hour indications were of a 10% depression from the normal in red blood cell choline esterase. There continued to be a decline over 4 hours to a level of 30% of the normal. The reading remained at this level for 12 more hours and after 18 hours it began to climb, indicating that the calf was metabolizing the poison faster than it was being released from the polymer combination. Thereafter the calf continued normal without any apparent or visible after effects.

A similar experiment using 100 mg./kilogram of the same biological, but not in polymer combination, produced severe poisoning symptoms within 45 minutes and the calf was almost dead in one hour. Past experience indicates death would have occurred except that atropine was injected at the rate of 10 mg./kilogram intravenously and 30 mg./kilogram intramuscularly. The calf recovered. Red blood cell choline esterase readings indicated a drop to 10% of normal which accounted for the poisoning symptoms.

Example 6

This example illustrates the in situ preparation of biological-resin combinations containing a water-miscible alcohol:

| | Parts |
|---|---|
| Dithiotepp | 3 |
| Aqueous formaldehyde, 37% | 10 |
| Urea | 5 |
| Tert. butyl alcohol | 15 |
| Sulphuric acid, 50% | 0.5 | are mixed together and the polymerized product ground to a fine powder in which form it may be sprayed on plants or onto or into the soil either as a concentrated dust or in combination with an inert carrier, for example, bentonite. With such carriers the resin-biological concentrate powder may be used in amounts from about 1 part thereof for each part of filler to 1 part to about 100 parts of filler. Alternatively, a dispersion in water using a suitable dispersing agent (e.g., Tamol NNO, an alkyl aryl sulphonate, sodium lignosulphonate, and the like) may be prepared and applied to the locus of the pest.

Example 7

The procedure of Example 1 is repeated except that the urea of that example is replaced by a molecularly equivalent amount of a mixture of equal parts of urea and thiourea.

Example 8

The procedure of Example 1 is again repeated employing in lieu of urea, molecularly equivalent amounts of the following combinations.

(A) urea-melamine (1:1)
(B) melamine
(C) dicyandiamide
(D) urea-thiourea-dycyandiamide (1:1:1)
(E) urea-guanidine (1:1)
(F) urea-ethyl urea (5:1)

Example 9

A composition comprising:

| | Parts |
|---|---|
| Aqueous formaldehyde, 37% | 8 |
| Urea | 5 |
| Captan (300 mesh) | 15 | is prepared and then 1 part lactic acid is added to effect polymerization. The polymer is then ground, pressed into a bolus, and used to control the flora in the rumen of cattle.

Example 10

A mixture comprising the following ingredients is prepared:

| | Parts |
|---|---|
| Aqueous formaldehyde, 40% | 10 |
| Urea | 5 |
| Methyl urea | 1 |
| Terramycin | 10 |
| Lactic acid | 1 |

Polymer formation results at room temperature within a short time. The material is crushed and formed into pills or placed into capsules. Excellent sustained action against bacterial and protozoan infections is achieved.

Example 11

A mixture of the following components is prepared:

| | Parts |
|---|---|
| Parathion | 15 |
| Formalin, 37% | 10 |
| Urea | 5 |
| Phosphoric acid, 85% | 0.5 |

Polymerization proceeds rapidly at ambient temperature to produce a resinous material which is ground to a fine powder in a hammer mill. The composition may be used in this concentrated form or diluted with any suitable inert material such as talc, clays, kaolin, sawdust, etc., for application to plants, soil, or animal surfaces wherein unusual and outstanding adherence is obtained.

Example 12

The procedure of Example 11 is repeated using Malathion in place of the biological of that example. After grinding, 10% by weight of calcium lignosulphonate and 0.5% by weight of sodium lauryl sulphate are added. A water-reducible, sprayable composition is obtained.

Example 13

The following composition is prepared:

| | Parts |
|---|---|
| Trithion (an organic phosphate) | 25 |
| Paraldehyde | 5 |
| Urea | 5 |
| Ethylene glycol | 10 |
| Sulphuric acid catalyst, 70% | 0.2 |

After polymerization is complete, the material is ground in a hammer mill and 10% by weight of bentonite and 1% by weight of sodium sulphosuccinate are added. This composition is excellent for spraying on plants whereby outstanding adherence and sustained activity is forthcoming.

Example 14

A composition of the following ingredients is prepared:

| | Parts |
|---|---|
| Formalin, 37% | 10 |
| Acetone | 10 |
| Urea | 5 |
| DDT | 5 |
| Sulphuric acid, 60% | 0.5 |

After polymerization and grinding, 10% by weight of sodium lignosulphonate and 1% by weight of Vatsol OTB are added. An excellent spray for plants and walls is obtained.

Example 15

The following composition is polymerized:

| | Parts |
|---|---|
| Formalin, 37% | 10 |
| Xylene | 10 |
| Urea | 5 |
| Chlordane | 5 |
| Sulphuric acid catalyst, 60% | 0.5 |

After grinding with 0.5% Vatsol OTB, an excellent water-emulsifiable composition is obtained.

While this invention has been disclosed with respect to certain varying modifications and preferred embodiments, other variations, modifications, and preferred embodiments thereof will be obvious and apparent to those skilled in the art. It is to be understood that such variations, modifications and embodiments are to be included within the spirit and purview of this application and the scope of the appended claims.

I claim:

1. A method of preparing a pesticidal composition in self-sustaining bulk form comprising forming a substantially homogeneous mixture, substantially devoid of inert carrier, of a pesticide and monomeric amido and monomeric aldehyde reactants capable of forming an amido-aldehyde resin in the presence of an acid catalyst, said reactants being employed in proportions yielding about 0.2 to 50 parts of resin per part of pesticide and then adding an acid catalyst to said mixture to form an amido-aldehyde resin in situ.

2. A method as defined in claim 1 wherein said reactants are urea and formaldehyde.

3. A method as defined in claim 1 wherein said pesticide is insecticidal.

4. A method as defined in claim 1 wherein said pesticide is fungicidal.

5. A method as defined in claim 1 wherein said pesticide is herbicidal.

6. A method as defined in claim 1 wherein said pesticide is nematocidal.

7. A method as defined in claim 1 wherein said pesticide is bactericidal.

8. A method as defined in claim 1 wherein said pesticide is organic.

9. A grindable solid composition comprising an insecticide imbedded in a urea-formaldehyde resin, the solid state having been attained by polymerization with insecticide in contact with the resin-forming constituents and an acid catalyst.

10. A grindable solid composition comprising an organic pesticide imbedded in a urea-formaldehyde resin, the solid state having been attained by polymerization with the organic pesticide in contact with the resin-forming constituents and an acid catalyst.

References Cited by the Examiner

UNITED STATES PATENTS

| | | | |
|---|---|---|---|
| 2,460,376 | 2/1949 | Caprio et al. | 106—15 |
| 2,490,958 | 12/1949 | Graencher. | |
| 2,491,287 | 12/1949 | Smith et al. | 106—15 |
| 2,516,283 | 7/1950 | Winheim et al. | 260—67.6 |
| 2,535,475 | 12/1950 | Anderson. | |
| 2,536,983 | 1/1951 | Owen. | |
| 2,565,278 | 8/1951 | Suen et al. | 260—67.6 |
| 2,637,661 | 5/1953 | Benignus. | |
| 2,645,627 | 7/1953 | Gustus. | |
| 2,853,420 | 9/1958 | Lowey | 167—42 |
| 2,919,200 | 12/1959 | Dubin et al. | 106—15 |
| 2,955,930 | 10/1960 | Dealy | 260—69 |

FOREIGN PATENTS

| | | |
|---|---|---|
| 709,721 | 6/1954 | Great Britain. |

OTHER REFERENCES

Block, Soap and Sanitary Chemicals, March 1948, pp. 151–153.

LEWIS GOTTS, *Primary Examiner.*

MORRIS O. WOLK, WILLIAM B. KNIGHT, *Examiners.*